United States Patent
Ho (10) Patent No.: US 7,438,486 B2
(45) Date of Patent: Oct. 21, 2008

(54) DEVICE WITH AN ELASTIC SHIFTING MECHANISM

(75) Inventor: Chin Hsin Ho, Hsinchu (TW)

(73) Assignee: Altek Corporation, Hsinchu (TW)

( * ) Notice: Subject to any disclaimer, the term of this patent is extended or adjusted under 35 U.S.C. 154(b) by 336 days.

(21) Appl. No.: 11/438,428

(22) Filed: May 23, 2006

(65) Prior Publication Data
US 2007/0274707 A1 Nov. 29, 2007

(51) Int. Cl.
*G03B 11/04* (2006.01)
*G03B 17/00* (2006.01)

(52) U.S. Cl. .............. 396/448; 455/575.4; 379/433.11; 379/433.12

(58) Field of Classification Search .............. 396/348, 396/429, 448; 379/433.11–433.13; 455/575.3, 455/575.4; 359/511
See application file for complete search history.

(56) References Cited

U.S. PATENT DOCUMENTS 6,086,266 A * 7/2000 Fujisaki .......... 396/448
6,980,840 B2 * 12/2005 Kim et al. ........ 455/575.4
2005/0078817 A1 * 4/2005 Lee ............. 379/433.12

* cited by examiner

*Primary Examiner*—Bot LeDynh
(74) *Attorney, Agent, or Firm*—Rosenberg, Klein & Lee (57) ABSTRACT

The present invention discloses a device with an elastic shifting mechanism, which comprises: a body and a movable element, wherein the body has a first snap-fit element, and the movable element has a second snap-fit element, and the movable element is installed to the body; the body/the movable element has a transmission element, and the movable element/the body has a drive element, and the drive element engages with the transmission element; two ends of an elastic element are respectively fixed to the transmission element and the body/the movable element; when said movable is being moved to enable the second snap-fit element to snap-fit the first snap-fit element, the drive element drives the transmission element to wind up the elastic element; when the second snap-fit element is disengaged from the first snap-fit element, the elastic element releases elastic force to move the movable element. Thereby, the device with an elastic shifting mechanism disclosed by the present invention has an automatic shifting function.

11 Claims, 9 Drawing Sheets

DEVICE WITH AN ELASTIC SHIFTING MECHANISM

BACKGROUND OF THE INVENTION

1. Field of the Invention

The present invention relates to a device with a shifting mechanism, particularly to a device with an elastic shifting mechanism.

2. Description of the Related Art

Figure 1:
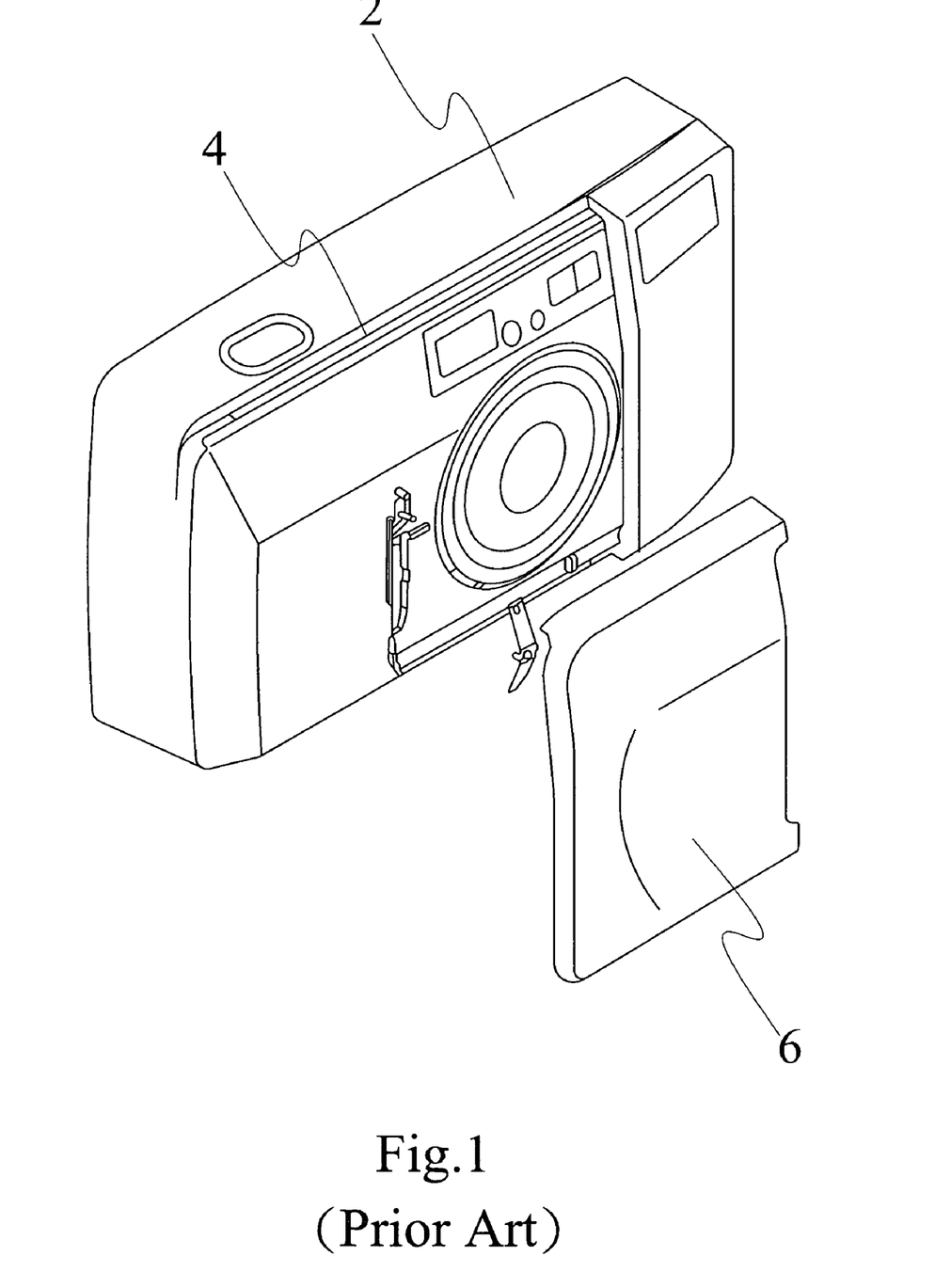
FIG. 1 is a diagram schematically showing a conventional camera.

The devices with an elastic shifting mechanism include: the digital camera and the slide-style mobile phone. As to the digital camera, the lens protection cover thereof has the lens-protection and dust-proof functions; when the digital camera is not being used, the lens protection cover should be moved to the position where the lens can be covered, and when the user intends to take pictures, the lens protection cover is moved to uncover the lens. Therefore, for a digital camera, the lens protection cover is the portion most likely to use the shifting mechanism. The conventional shifting mechanism of a lens protection lens is usually a slide-way mechanism. Refer to FIG. 1 for a U.S. Pat. No. 5,819,127, which discloses a camera with a slide-way mechanism. As shown in FIG. 1, the camera 2 has two slide ways 4 respectively disposed in the upper side and the lower side thereof, and a slide cover 6 functioning as the lens protection cover is slidably installed to the slide ways 4. However, in such a design, the user is inconvenienced by having to push the slide cover 6 back to its original position manually, which also degrades the performance of the camera. To solve the abovementioned problem, there are the digital cameras with an electrically driven slide cover, wherein a motor is used to automatically restore the slide cover to its original position. However, in such a digital camera, the motor will consume considerable power, and the standby time of the digital camera is thus shortened. Besides, the battery holder of a digital camera is commonly installed fixedly inside the digital camera. When the batteries are to be replaced, the camera has to be flipped over so that the batteries can slide out of the battery holder. However, such an operation may risk the slip and fall of the digital camera.

Figure 2:
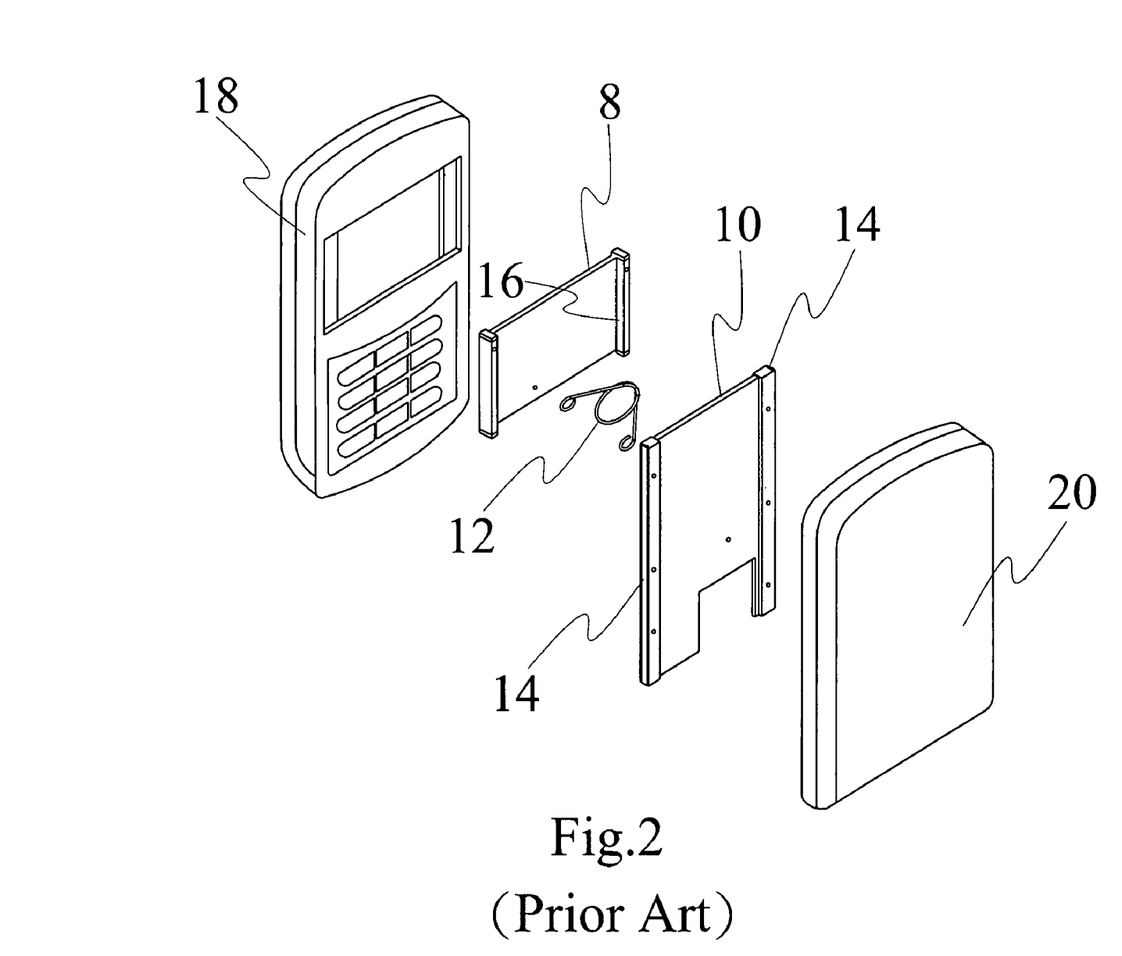
FIG. 2 is a perspective exploded view schematically showing a conventional slide-style mobile phone.

In addition to the digital camera, the slide-style mobile phone also has a shifting mechanism. The conventional slide-style mobile phone has slide-way and snap-fit structures. When the user intends to use the slide-style mobile phone, he pushes the slide key cover to disengage from a first snap-fit structure between the slide key cover and the phone body, and the slide key cover slides along the slide way until the slide key cover snap-fits the phone body again at a second snap-fit structure. When the phone call is over, the user disengages the second snap-fit structure and pushes the slide key cover to slide along the slide way back to its original position. However, such a design is inconvenient for the user. Therefore, there is a conventional slide-style mobile phone with a spring existing, wherein with only a slight push or pull, the spring will push the slide key cover back to it original position automatically. Refer to FIG. 2 for a Taiwan patent No. 252209, which discloses a mobile phone with a slide-cover structure. As shown in FIG. 2, the slide-cover structure comprises: a base plate 8, an upper cover 10, and a spring 12. The base plate 8 has two slide ways 16 disposed at both side thereof, and the slide rails 14 can be embedded inside the slide ways 14. One end of the spring 12 is installed to a lateral side of the base plate 8, and the other end of the spring 12 is installed to the corresponding side of the upper cover 10. The base plate 8 and the upper cover 10 are respectively fixed to an upper body 18 and a lower body 20 of the mobile phone. Thus, the upper body 18 and the lower body 20 can slide relatively to each other with the spring 12 automatically restoring them to the original position. However, after the spring 12 has been compressed and released repetitively for a period of time, the spring 12 will be distorted or fractured because of stress concentration; thus, the slide-cover structure of the mobile phone can no more operate.

Accordingly, the present invention proposes a device with an elastic shifting mechanism to overcome the abovementioned problems.

SUMMARY OF THE INVENTION

The primary objective of the present invention is to provide a device with an elastic shifting mechanism, wherein a transmission element is used to wind up an elastic element, and the elastic force released by the elastic element drives a movable element to move automatically.

Another objective of the present invention is to provide a device with an elastic shifting mechanism, which has a simple structure and does not affect the appearance of the device.

Further objective of the present invention is to provide a device with an elastic shifting mechanism, wherein the movable element of the device can be automatically restored to its original position without manual operation.

To achieve the abovementioned objectives, the device with an elastic shifting mechanism of the present invention comprises: a body with a first snap-fit element and a movable element with a second snap-fit element. At least one transmission element and a drive element are respectively installed to the body and the movable element. Both ends of an elastic element are respectively fixed to the transmission element and the body. When the movable element is being moved to a position where the second snap-fit element can engage with the first snap-fit element, the drive element simultaneously drives the transmission element to rotate so that the transmission element can wind up the elastic element. When the second snap-fit element is disengaged from the first snap-fit element, the elastic force released by the elastic element will drive the transmission element to rotate, and the rotating transmission element will further drive the movable element to move. Otherwise, the transmission element and one end of the elastic element may be installed to the movable element, and the drive element may be installed to the body. The transmission element further comprises: a gear and a gear shaft, and the drive element may be a gear rack. One end of the elastic element is fixed to the gear shaft. The body has at least one slide way/slide rail, and the movable element has at least one slide rail/slide way, and the slide rail is disposed inside the slide way so that the movable element can slide along the direction of the slide way. In the present invention, the body and the movable element may be respectively a camera and the sliding lens cover thereof, or respectively a slide-style mobile phone and the sliding key cover thereof.

To enable the objectives, technical contents, characteristics, and accomplishments of the present invention to be more easily understood, the embodiments of the present invention are to be described in detailed in cooperation with the attached drawings below.

DETAILED DESCRIPTION OF THE INVENTION

In the device with an elastic shifting mechanism of the present invention, the body thereof has an elastic element and at least one transmission element; a movable element is installed to the body, and a drive element is installed to the movable element; moving the movable element will also move the drive element, and the moving drive element will drive the transmission element to rotate, and the rotating transmission element will further wind up the elastic element; and the displaced movable element can be restored to its original position by the elastic force released by the wound up elastic element.

Below, the present invention will be exemplified with a camera, wherein the body is a camera, and the movable element is a lens protection cover, and the transmission element is a gear with a gear shaft, and the drive element is a gear rack, and the elastic element is a band spring.

Figure 3:
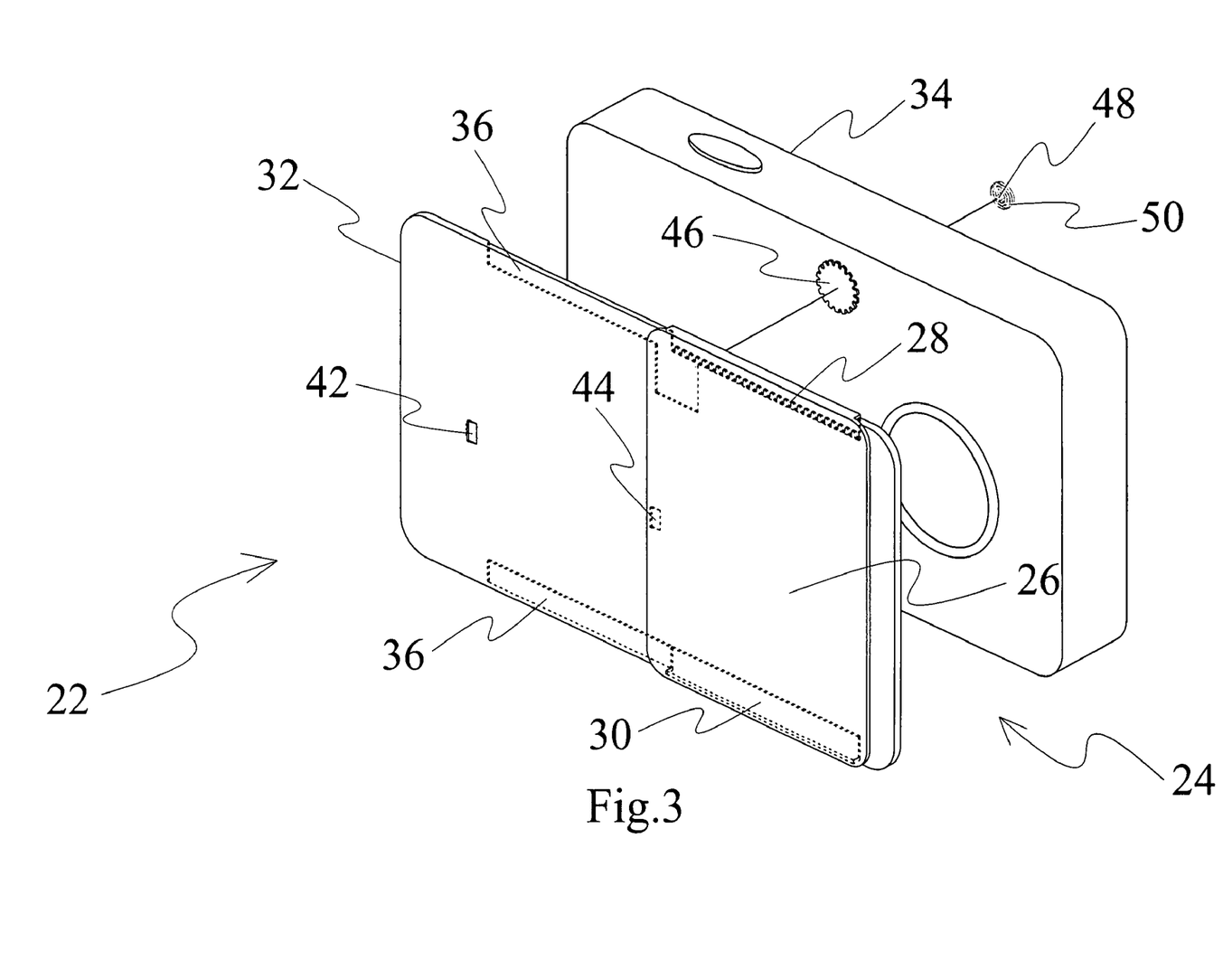
FIG. 3 is a perspective view schematically one embodiment of the present invention.
Figure 4A:
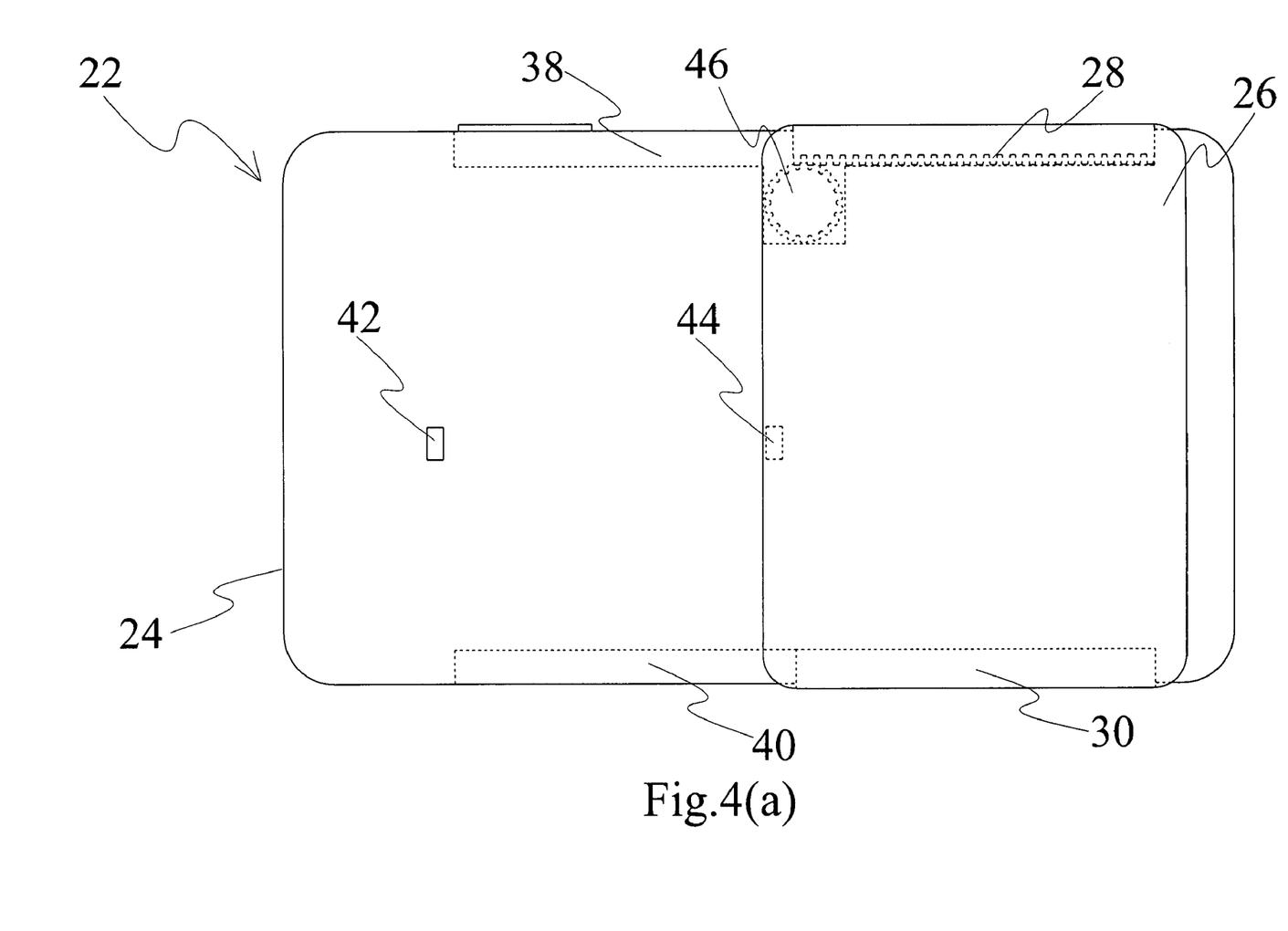
FIG. 4(a) and FIG. 4(b) are diagrams schematically showing the operation of the device of the present invention.

Refer to FIG. 3 and FIG. 4(a). According to one embodiment of the present invention, a camera 22 essentially comprises: a camera body 24 and a lens protection cover 26. The upper side and the lower side of the lens protection cover 26 respectively have a gear rack 28 and a slide rail 30. The camera body 24 further comprises: a first body 32 and a second body 34. Each of the upper side and the lower side of the first body 32 has a trench 36. After the first body 32 and the second body 34 are assembled, the upper side and the lower side of the camera body 24 have a motion trench 38 and a slide way 40. The camera body 24 and the lens protection cover 26 respectively have a snap-hook 42 functioning as a first snap-fit element and a snap-slot 44 functioning as a second snap-fit element. In the present invention, the first snap-fit element may also be the snap-slot 44, and the second snap-fit element may also be the snap-hook 42. A gear 46, which can engage with a gear rack 28, is installed to one end of a gear shaft 48, and the other end of the gear shaft 48 is installed to the camera body 24, and thereby, the gear 46 is also installed to the camera body 24. One end of a band spring 50 is fixed to the gear shaft 48, and the other end of the band spring 50 is fixed to the camera body 24. Further, a protection element may be installed to the camera body 24 or the lens protection cover 26 to avoid the collision between the camera body 24 and the lens protection cover 26 when the lens protection cover 26 is moved. The slide rail 30 is disposed inside the slide way 40, and the gear 46 are engaged with the gear rack 28 inside the motion trench 38; thus, the lens protection cover 26 is slidably installed to the camera body 24, and the lens protection cover 26 can slide along the slide way 40.

Figure 4B:
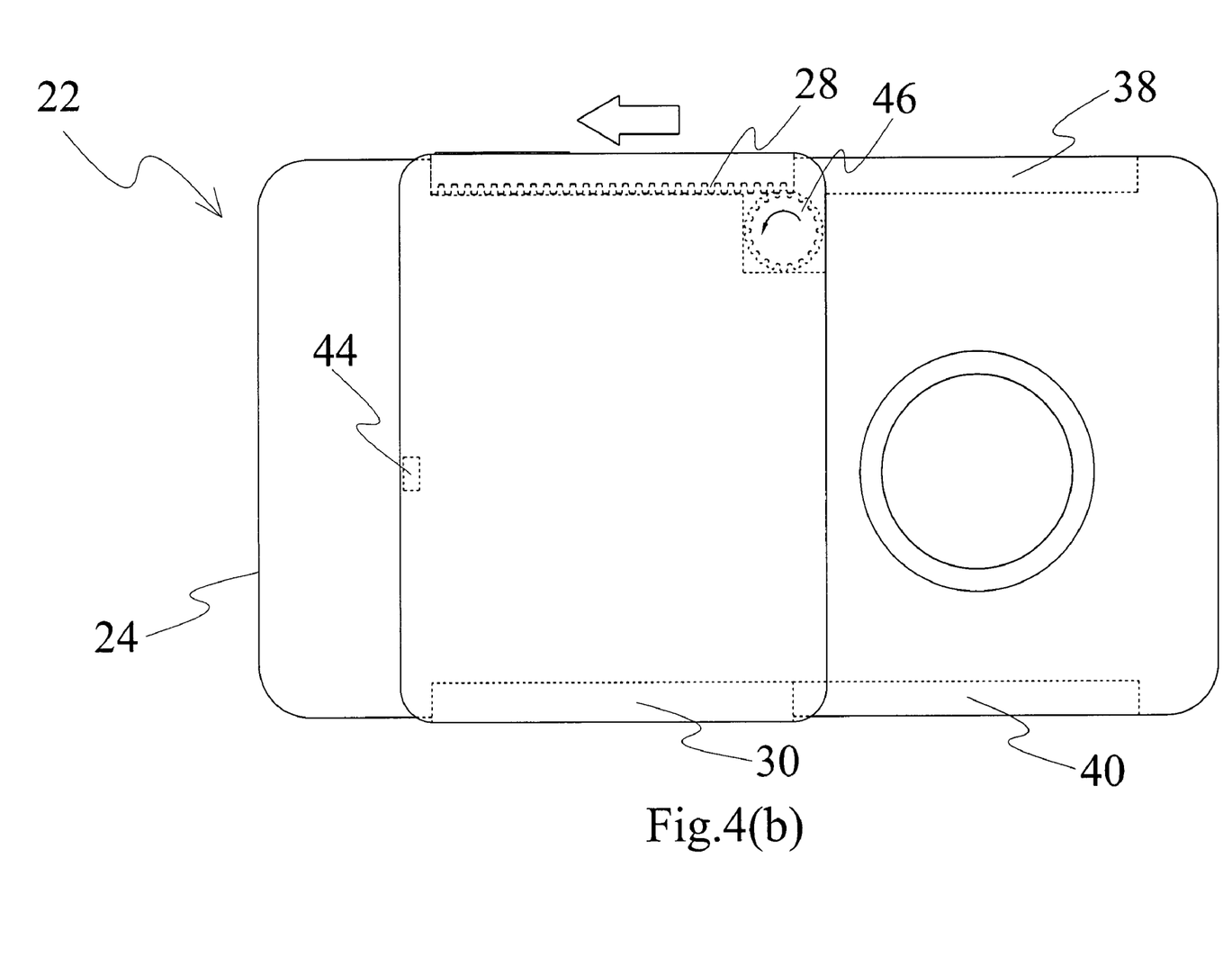

Next, refer to FIG. 4(a) and FIG. 4(b) diagrams schematically showing the operation of the camera 22. When the user opens the lens protection cover 26 of the camera 22 for taking pictures, the moving lens protection cover 26 will drive the gear rack 28 to move along the motion trench 38, and the moving gear rack 38 will synchronically drive the gear 46 to rotate, and the rotating gear 46 will drive the gear shaft 48 to wind up the band spring 50 gradually. When the lens protection cover 26 is moved to a position where the snap-hook 42 snap-fits the snap-slot 44, the lens protection cover 26 is fixed there, and the band spring 50 is kept in the wound-up state. When the user finishes the photographing of the camera 22, he disengages the snap-hook 42 from the snap-slot 44, and the gear shaft 48 is driven to rotate by the elastic force released from the wound-up band spring 50, and the rotating gear shaft 48 drives the gear 46 to rotate, and the rotating gear 46 further drives the gear rack 28 to move inside the motion trench 38; thus, the slide rail 30 can slide along the slide way 40, and the lens protection cover 26 can be restored to it original position. As described above, the present invention has a simple structure, which will not affect the appearance of the camera. Further, the present invention can automatically restore the lens protection cover 26 to its original position without manual operation when the user has finished photographing. Furthermore, the operation of the present invention does not consume any battery power because the energy for automatically restoring the lens protection cover 26 to its original position comes from the wound-up band spring 50.

The present invention is not limited to the case that the gear 46 and the gear shaft 48 are installed to the camera body 24 and the gear rack 28 is installed to the lens protection cover 26, but may also be the case that the gear 46 and the gear shaft 48 are installed to the lens protection cover 26 and the gear rack 28 is installed to the camera body 24. In the latter case, the end of the band spring 50, which is fixed to the camera body 24 originally, will be otherwise fixed to the lens protection cover 26. Further, the slide rail 30 and the slide way 40 may be otherwise respectively installed to the camera 24 and the lens protection cover 26. Furthermore, in addition to the abovementioned band spring 50, the elastic element may also adopt a spring or a torsion spring.

Figure 5:
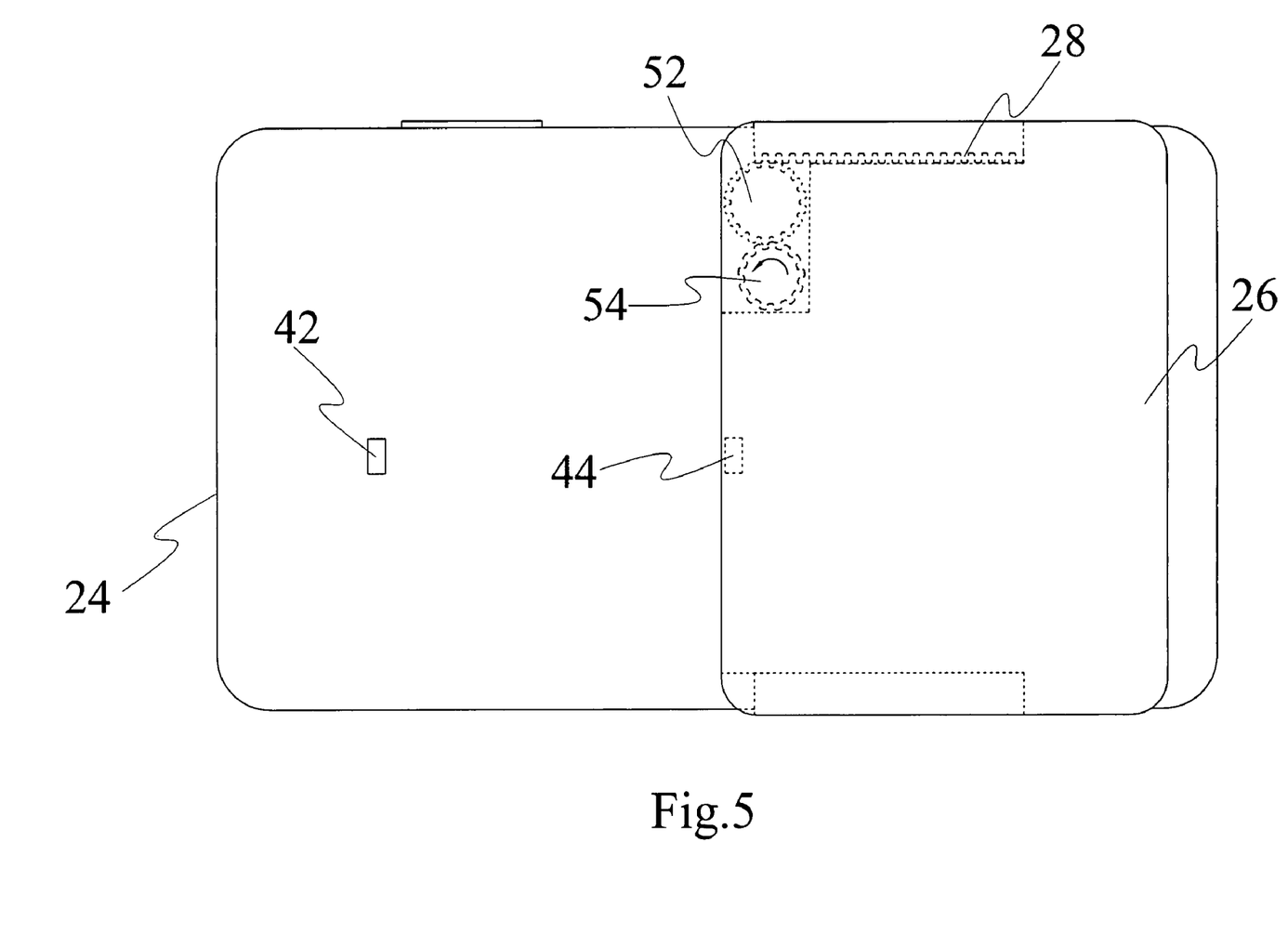
FIG. 5 is a diagram schematically showing the operation of the device according to another embodiment of the present invention.

When the gear rack is too short or the motion travel of the lens protection cover is not long enough, the gear may not wind the band spring to the necessary tightness. In order to solve the abovementioned problem, the band spring may be pre-wound to an appropriate extent. The abovementioned problem may also be solved by a gear-ratio method: a larger gear is used to drive a smaller gear so that the turning number of the smaller gear will increase for a given travel of the gear rack; thereby, the band spring can be wound to the necessary extent. Refer to FIG. 5 a diagram schematically showing the operation of the elastic shifting mechanism with a larger gear and a smaller gear according to another embodiment of the present invention. The camera body 24 comprises: a larger gear 52, which cooperates with its gear shaft to function as a first transmission element, and a smaller gear 54, which cooperates with its gear shaft to function as a second transmission element, wherein the larger gear 52 engages with the gear rack 28, and the smaller gear 54 engages with the larger gear 52, and one end of the band spring is fixed to the gear shaft of the smaller gear 54. When the lens protection cover 26 is being moved to engage the snap-hook 42 with the snap-slot 44, the gear rack 28 installed to the lens protection cover 26 will drive the larger gear 52 to rotate, and the rotating larger gear 52 will drive the smaller gear 54 to rotate, and thus, the band spring with one end fixed to the gear shaft of the smaller gear 54 will be wound up gradually until the snap-hook 42 snap-fits the snap-slot 44, and the band spring is maintained in the wound-up state. When the snap-hook 42 is disengaged from the snap-slot 44, the band spring will have sufficient elastic force to drive the smaller gear 54 to rotate, and the rotating smaller gear 54 will drive the larger gear 52 to rotate, and the larger 52 will further drive the gear rack 28 to move, and thus, the lens protection cover 26 is restored to its original position automatically.

Figure 6A:
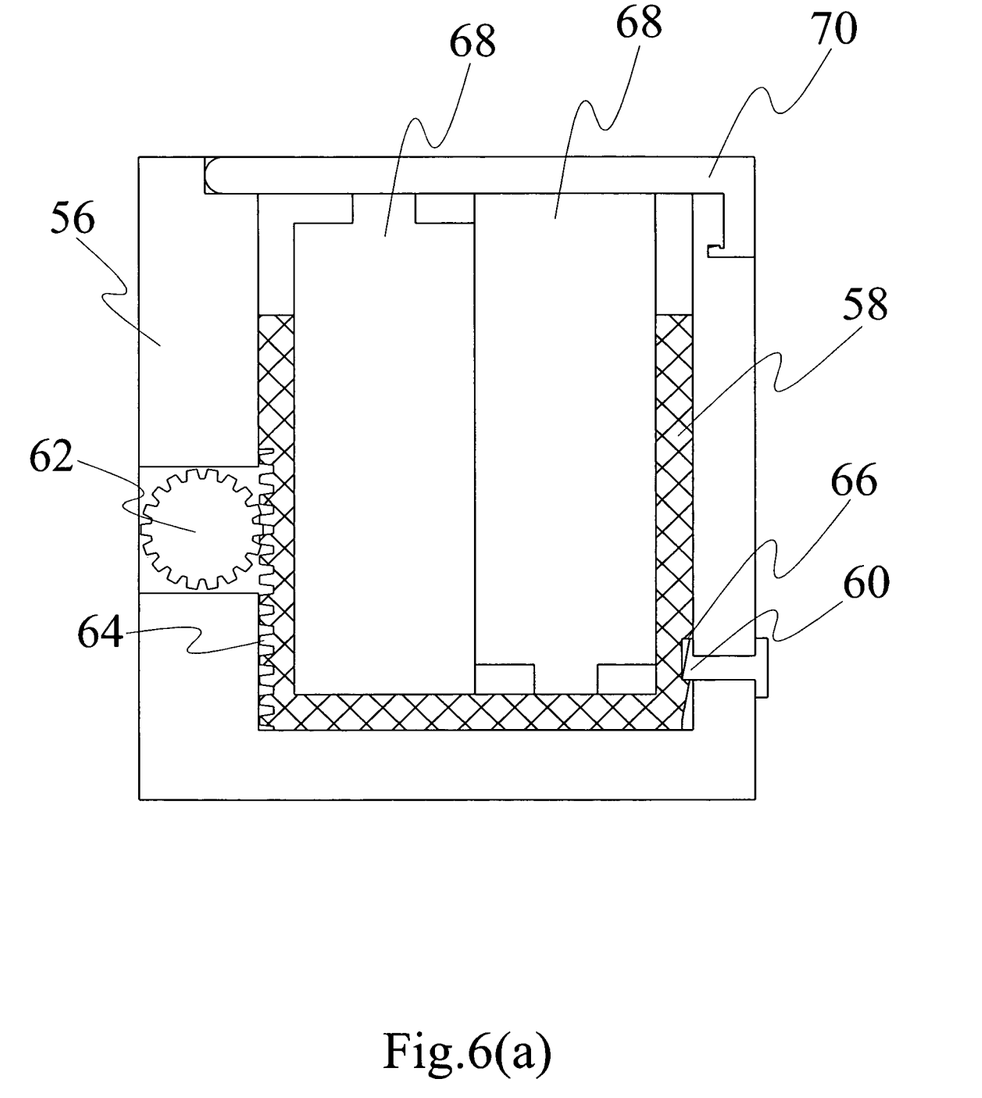
FIG. 6(a) and FIG. 6(b) are sectional views schematically the operation of the device according to still another embodiment of the present invention.
Figure 6B:
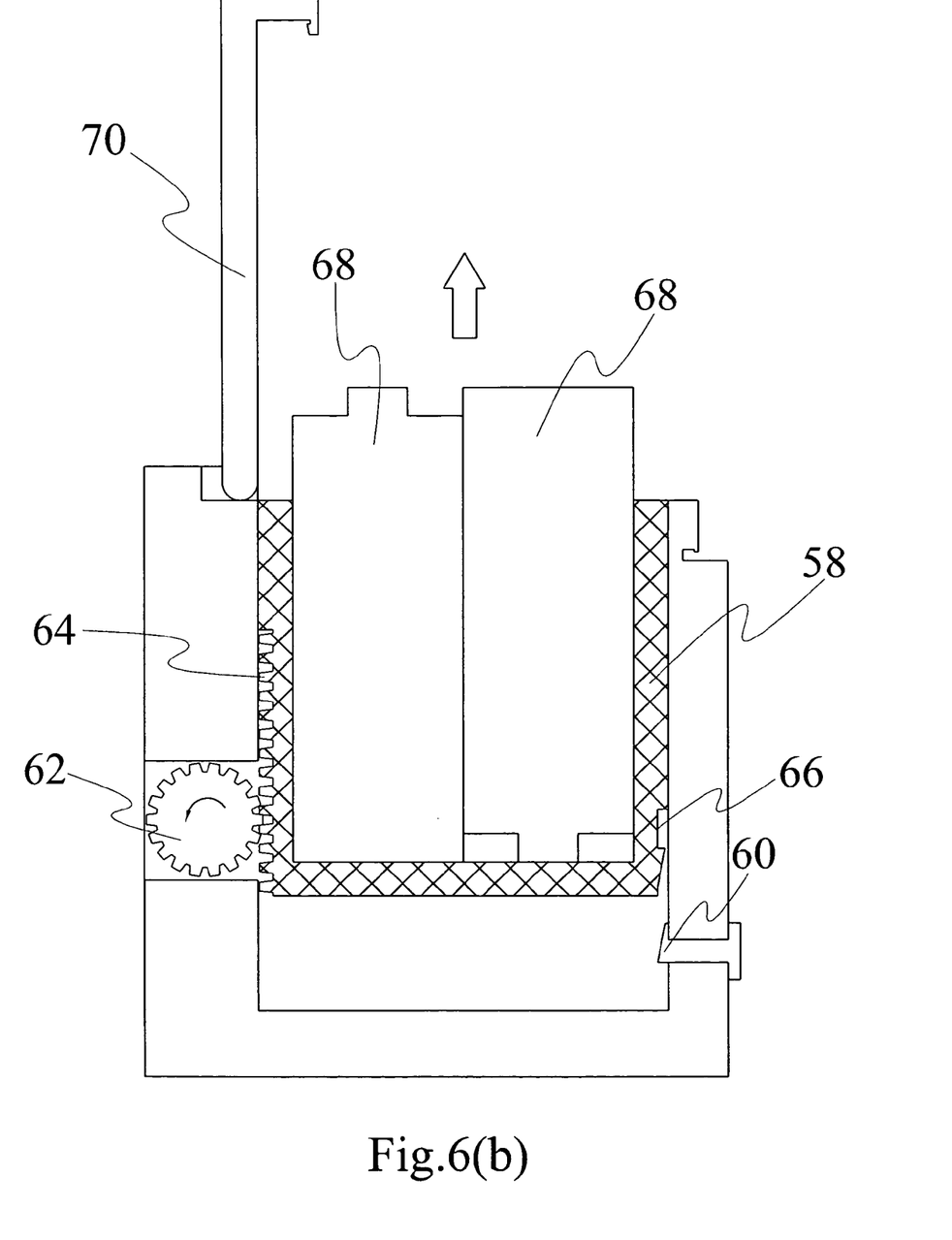

In addition to a camera and its lens protection cover, the present invention may also apply to a camera and it battery holder, or to a slip-style mobile phone and its sliding key cover. Refer to FIG. 6(*a*) a partial sectional view schematically showing still another embodiment of the present invention. In this embodiment, a camera comprises: a camera body 56 and a battery holder 58. The camera body 56 has a snap-hook 60. A gear 62 is installed to the camera body 56 with a gear shaft. Two lateral side of the battery holder 58 respectively have a gear rack 64 and a snap-slot 66. One end of a band spring is fixed to the gear shaft, and the other end of the band spring is fixed to the camera body 56. After batteries 68 have been placed inside the battery holder 58, the battery holder 58 is pressed into the camera body 56, and at the same time, the gear rack 64 drives the gear 62 to rotate; thus, the band spring is wound up gradually until the snap-hook 60 snap-fits the snap-slot 66, and the band spring is maintained in the wound-up state, and then, the battery cover 70 is shut. Refer to FIG. 6(*b*). When the batteries 68 are used up and to be replaced, the battery cover 70 is opened, and the snap-hook 60 is disengaged from the snap-slot 66, and the band spring releases elastic force to drive the gear 62 to rotate, and the rotating gear 62 drives the gear rack 64 to move; thus, the battery holder 58 is raised, and the user can take out the batteries 68 without flipping the camera over. When the replacement of the batteries is completed, the battery holder 58 is pressed into the camera body 56, and the battery cover 70 is shut. The rest of this embodiment is similar to the contents of the abovementioned embodiment, and it will not be repeated here.

Figure 7:
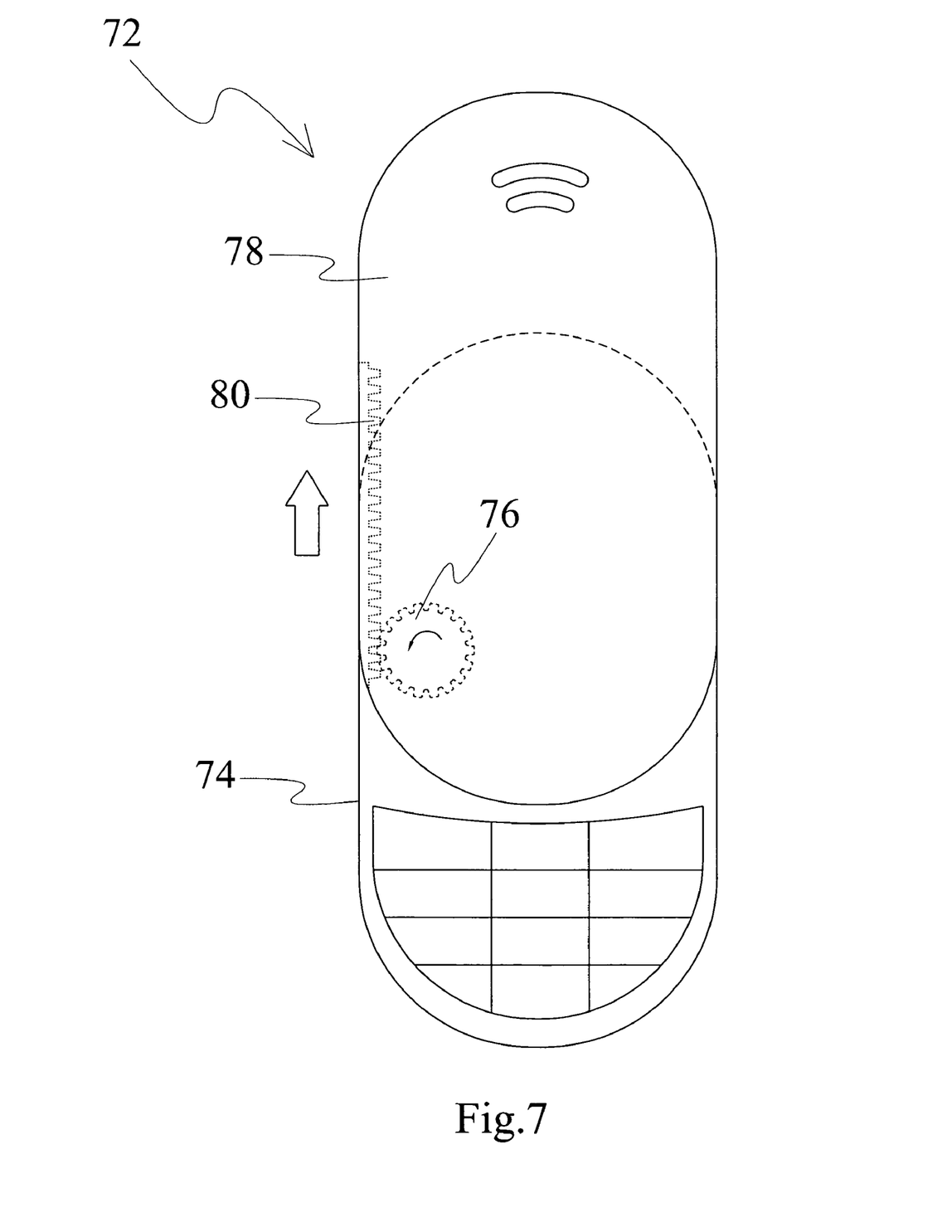
FIG. 7 is a diagram schematically showing the operation of the device according to further another embodiment of the present invention.

Refer to FIG. 7 a diagram schematically showing the application of the present invention to a slide-style mobile phone 72 according to further another embodiment of the present invention. The principle of this embodiment is the same as that of the abovementioned embodiments. The slide-style mobile phone 72 has a phone body 74 and a sliding key cover 78. The phone body 74 has a gear 76 and a gear shaft, and the sliding key cover 78 has a gear rack 80. When the user intends to use the slide-style mobile phone 72, he pushes the sliding key cover 78 upward, and at the same time, the gear rack 80 is also pushed upward, the up-moving gear rack 80 drives the gear 76 to rotate; thus, the band spring is wound up gradually until a snap-hook snap-fits a snap-slot, and the band spring is maintained in the wound-up state. When the phone call is over, the user disengages the snap-hook from the snap-slot, and the band spring releases elastic force, and the gear 76 is driven to rotate, and the rotating gear 76 drives the gear rack 80 to move; thus, the sliding key cover 78 is restored to its original position. The rest of this embodiment may refer to the abovementioned embodiments, and it is no more repeated here. In comparison with the conventional slide-style mobile phones, the slide-style mobile phone adopting the present invention can be free from spring distortion or spring fracture resulting from elastic fatigue or metallic fatigue induced by stress concentration.

Those embodiments described above are to clarify the present invention in order to enable the persons skilled in the art to understand, make, and use the present invention. However, it is not intended to limit the scope of the present invention, and any equivalent modification and variation according to the shapes, structures, characteristics, and spirit disclosed in the present invention is to be also included within the scope of the claims of the present invention stated below.

What is claimed is:

1. A device with an elastic shifting mechanism, comprising:
    a body, having a first snap-fit element;
    a movable element, installed to said body, and having a second snap-fit element;
    at least one transmission element, installed to said body/ said movable element;
    an elastic element, with one end thereof fixed to said transmission element and the other end fixed to said body/ said movable element; and
    a drive element, installed to said movable element/said body, engaging with said transmission element,
    wherein when said movable element is being moved to enable said second snap-fit element to snap-fit said first snap-fit element, said drive element drives said transmission element to rotate, and said transmission element winds up said elastic element; when said second snap-fit element is disengaged from said first snap-fit element, said elastic element releases elastic force to drive said transmission element to rotate, and said transmission element further drives said movable element to move.

2. The device according to claim 1, wherein said body is a camera, and said movable element is a lens protection cover of said camera.

3. The device according to claim 1, wherein said body is a camera, and said movable element is a battery holder of said camera.

4. The device according to claim 1, wherein said body is a slide-style mobile phone, and said movable element is a sliding key cover of said slide-style mobile phone.

5. The device according to claim 1, wherein said transmission element further comprises: a gear and a gear shaft, and said drive element is a gear rack, and said elastic element is fixed to said gear shaft.

6. The device according to claim 1, wherein said elastic element is a spring, a band spring, or a torsion spring.

7. The device according to claim 1, wherein said body has at least one slide way/slide rail, and said movable element has at least one slide rail/slide way, and said slide rail is disposed inside said slide way so that said movable element can move along said slide way.

8. The device according to claim 1, wherein said first snap-fit element is a snap-hook, and said second snap-fit element is a snap-slot.

9. The device according to claim 1, wherein said first snap-fit element is a snap-slot, and said second snap-fit element is a snap-hook.

10. The device according to claim 1, wherein said body/ said movable element has a first transmission element and a second transmission element, and said first transmission element engages with said second transmission element, and said first transmission also engages with said drive element, and one end of said elastic element is fixed to said second transmission element; when said drive element drives said first transmission element to rotate, said second transmission element is also driven to rotate and wind up said elastic element.

11. The device according to claim 1, further comprising a protection element, which is installed to said body or said movable element and used to prevent the collision between said body and said movable element when said transmission element drives said movable element to move.

* * * * *